(12) United States Patent
Young

(10) Patent No.: US 6,441,873 B2
(45) Date of Patent: *Aug. 27, 2002

(54) REFLECTIVE LIQUID CRYSTAL DISPLAY DEVICE HAVING AN ARRAY OF DISPLAY PIXELS

(75) Inventor: Nigel D. Young, Redhill (GB)

(73) Assignee: Koninklijke Philips Electronics, N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,647

(22) Filed: Sep. 27, 1999

(30) Foreign Application Priority Data

Oct. 2, 1998 (GB) .............................. 9821311

(51) Int. Cl.⁷ ............................... G02F 1/136
(52) U.S. Cl. .......................... 349/43; 257/59
(58) Field of Search ................ 349/42, 43; 257/59, 257/72

(56) References Cited

U.S. PATENT DOCUMENTS

| | | | |
|---|---|---|---|
| 5,032,883 A | * 7/1991 | Wakai et al. ............. | 349/42 |
| 5,130,829 A | 7/1992 | Shannon ................. | 359/59 |
| 5,208,690 A | * 5/1993 | Hayashi et al. ........... | 349/42 |
| 5,784,131 A | * 7/1998 | Kim et al. ............... | 349/43 |
| 6,002,462 A | * 12/1999 | Sato et al. .............. | 349/42 |

FOREIGN PATENT DOCUMENTS

EP 0617310 A1 9/1994 ......... G02F/1/1335

* cited by examiner

Primary Examiner—Toan Ton
(74) Attorney, Agent, or Firm—Ernestine C. Bartlett

(57) ABSTRACT

In a reflective liquid crystal display device comprising on a substrate an array of reflective pixel electrodes which are each connected to the output of a respective switching device, e.g. a TFT, carried on the substrate and which are provided on an insulating layer that extends over the switching device, each pixel electrode is connected to the output of its associated switching device through a plurality of tapered contact openings in the insulating layer which form depressions in the pixel electrode surface for enhancing the pixel's light reflection characteristics. The number, shape, size and relative disposition of such openings can be varied to tailor these characteristics. Preferably, a conductive layer extends from the switching device output beneath the area of the pixel electrode for contacting the electrode at each opening and may have a rough surface resulting in asperities at the pixel electrode surface which further enhance its reflection properties.

10 Claims, 3 Drawing Sheets

REFLECTIVE LIQUID CRYSTAL DISPLAY DEVICE HAVING AN ARRAY OF DISPLAY PIXELS

BACKGROUND OF THE INVENTION

The present invention relates to a reflective liquid crystal display device comprising first and second substrates between which liquid crystal material is disposed and electrodes provided on the substrates defining an array of display pixels, the first substrate having an array of optically reflective pixel electrodes each of which is connected to the output of a respective switching device carried on the first substrate and is provided on the surface of an insulating layer extending over the first substrate and covering the switching devices.

An example of such a display device is described in EP-A-0617310. In this device, a row and column matrix array of display pixels is provided, each of which is driven via an associated switch device in the form of a TFT (thin film transistor). The TFTs are carried on the surface of a first substrate together with sets of row, selection, conductors and column, data, conductors through which the TFTs are addressed for driving the display pixels. As in conventional active matrix LCDs using TFTs, each TFT is disposed adjacent the intersection between respective ones of the row and column conductors. The gates of all the TFTs associated with a row of display pixels are connected to a respective row conductor and the sources of all the TFTs associated with a column of pixels are connected to a respective column conductor. Unlike conventional active matrix LCDs, however, in which the individual pixel electrodes are arranged substantially co-planar with, and laterally of, the TFTs, the reflective pixel electrodes in this device are carried on an insulating film which extends over the first substrate and covers the TFTs and the sets of address conductors so that the pixel electrodes are positioned generally above the level of the TFTs and the address conductors. Each individual pixel electrode is connected to the drain electrode of its associated TFT through a respective opening formed in the insulating film directly over the drain-electrode. An advantage of this type of construction, in which the array of pixel electrodes and the array of TFTs are provided at different levels above the substrate surface, is that the pixel electrodes can be enlarged such that at two opposing sides they extend slightly over adjacent row conductors and at their two other opposing sides they extend slightly over adjacent column conductors rather than being sized smaller than the spacing between adjacent row conductors and adjacent column conductors with small gaps provided between each edge of the pixel electrode and the adjacent conductor, as in conventional display device arrangements. In this way, therefore, the pixel aperture is increased and in operation more light which passes through the liquid crystal layer and reaches the pixel electrode is reflected back to produce a brighter display output. Moreover, parts of a deposited metal layer which is patterned to form the reflective pixel electrodes can be left immediately overlying the TFTs during the patterning process so as to act as light shields for the TFTs to reduce photoelectric effects in the TFTs due to light incident thereon, thereby avoiding the need to provide black matrix material on the other substrate for this purpose as is usual. This other, transparent, substrate carries a continuous transparent electrode common to all pixels in the array and, in the case of a colour display, an array of colour filter elements corresponding to the array of pixels with each filter element overlying a respective pixel electrode.

In order to improve the reflection characteristics of the pixels, particularly the resulting intensity of light scattering in the direction perpendicular to the display panel with respect to light incident on the pixel electrode at any angle, the pixel electrodes in the display device of EP-A-0617310 are made undulating by forming the region of the insulating film underlying the reflective pixel electrode with a plurality of randomly arranged bumps so that the pixel electrode deposited thereon, and comprising a metal layer of substantially constant thickness, similarly has surface bumps. These bumps on the pixel electrode serve to scatter light so that a greater proportion of light incident on the electrode from any angle is reflected in a direction normal to the panel to increase pixel luminance. The bumps in the insulating film are themselves formed by patterning a deposited photoresist layer with the aid of a mask, light exposure and development to leave discrete dots of photoresist whose area and position are determined by the mask, and then depositing a further organic insulating layer over these dots. Thereafter a contact opening is formed at each pixel in the insulating film overlying the drain electrode of the TFT and a reflective metal layer is deposited which extends through these openings to contact the underlying drain electrodes and which is patterned to define the individual pixel electrodes.

The formation of the undulating pixel electrodes is thus complicated, involving the deposition and processing of a number of separate layers including photoresist and organic insulating films which add significantly to the complexity of manufacture. Importantly, it is necessary for the dots of photoresist material to be shaped appropriately to avoid sharp edges and the like so that suitably shaped bumps result at the surface of the pixel electrodes and also for the region overlying the drain electrodes to be kept free of bumps.

SUMMARY OF THE INVENTION

It is an object of the present invention to provide an improved reflective LCD of the kind described in the opening paragraph.

It is another object of the present invention to provide a reflective LCD of the aforementioned kind which is relatively simple to manufacture.

According to the present invention, there is provided a reflective LCD of the kind described in the opening paragraph which is characterised in that the pixel electrode is connected to the output of the switching device via a plurality of contact openings in the insulating layer at spaced locations over the area of the pixel electrode and having sloping sidewalls over which the pixel electrode extends. The plurality of contact openings serve to enhance the reflection characteristics of the pixel electrode. These contact openings result in depressions in the pixel electrode surface which, in comparison with the structure of EP-A-0617310, are effectively negative, or inverse, bumps but which behave in similar, light scattering, fashion for reflecting incident light. Moreover, the plurality of contact openings serves also to provide a degree of redundancy in the electrical connection between the pixel electrode and the switching device output.

The plurality of contact openings at each pixel location can be provided in simple manner, for example by patterning the insulating layer photolithographically using a mask to define the contact openings and their relative disposition. The layer may be etched or, in the case of the insulating layer comprising a photo-resist material, photodeveloped. It is to be noted that in the device of EP-A-617310, a single contact opening is provided in the insulating layer by a photolithographic process before the pixel electrode is deposited so as to enable electrical connection between the pixel electrode and the underlying drain electrode of the TFT to be established. The provision of a plurality of contact openings in the device of the present invention does not add significantly to the complexity of the processing in this manufacturing stage and can be accomplished without any additional processing operations being required.

Preferably, the plurality of contact openings are arranged regularly over a substantial part of the pixel electrode area, for example in a generally uniform row and column array occupying 50% or more of the overall area of the pixel electrode. The number, size, shape and relative disposition of the openings can be varied. For example, the openings may be generally circular or square. As a consequence of the openings being formed by a photolithographic method such as etching the sidewalls of the openings in the insulating layer will be sloping to some extent so that the shape of the resulting depressions in the subsequently deposited pixel electrodes will be tapering, e.g. generally conical in the case of circular openings. The exact shape of the depressions will depend though on the relative thicknesses of the insulating layer, and thus the depth of the openings, and the material of the pixel electrode layer as well as the width of the openings. If the pixel electrode layer is relatively thick then the resulting depressions formed therein will tend to smoothed out to some extent, for example in the nature of inverted domes. The openings may be spaced apart from one another so that substantially flat areas of the pixel electrode layer exist between adjacent openings or arranged close together so that the extent of the pixel electrode material between the depressions is reduced or minimised.

Depending on the number and position of the contact openings with respect to the switching device, connection between the pixel electrode and the output of the switching device may be achieved via respective, individual, electrically conductive tracks underlying the insulating layer and extending from the switching device. Preferably, however, an electrically conductive layer connected to the output of the switching device is provided beneath the insulating layer extending over a substantial part of the area of the pixel electrode, corresponding to the region in which the contact openings are formed. In the case of the switching device comprising a TFT, this conductive layer may be formed integrally with the drain electrode of the TFT, as an extension, from a single deposited layer. Again, comparing this with the display device of EP-A-0617310, it will be appreciated that the provision of this underlying electrically conducting layer requires no significant additional processing operations. Thus, the reflection property enhancing depressions in the pixel electrode of the device of the present invention can be provided in simple manner merely by modifying certain existing fabrication operations.

Preferably, the surface of this electrically conductive layer is rough so that after depositing the insulating layer and pixel electrode thereon the surface of the pixel electrode possesses a degree of roughness, providing surface asperities. Such roughness in the surface of the pixel electrodes in the regions around the contact openings assists in achieving desirable scattering reflection characteristics. The roughness of the conductive layer may be introduced deliberately or achieved as a natural consequence of fabrication processing by appropriately selecting the deposition conditions. In the case, for example, of the switching device comprises a polysilicon TFT having source and drain contacts of laser crystallised, n type, polysilicon, the n type polysilicon material inherently has a degree of surface roughness which may be adequate for this purpose. If a metal is used for this layer then depositing the metal in a substantially pure form will tend to create bigger grains, and hence roughness. Also, the deposited material of this underlying electrically conducting layer may be deliberately roughened by further processing in a known manner to provide this effect.

It will be appreciated that switching devices other than TFTs may be employed, for example two-terminal non linear switching devices such as MIMs or TFDs (thin film diodes). When using such devices it is necessary to provide only one set of address conductors, e.g. the row, selection, address conductors on the same substrate as the switching devices and reflective pixel electrodes, the other set of address conductor, e.g. the column, data, address conductors, being provided on the other substrate.

The display device may be a monochrome display device or a colour display device in which colour filter elements are provided on the other substrate, for example as described in EP-A-0617310.

Figure 1:
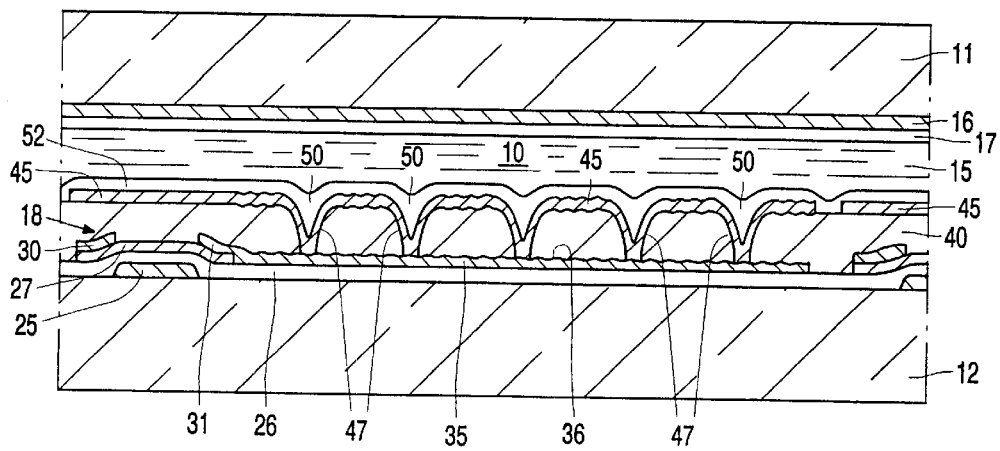
FIG. 1 is a schematic, cross-sectional view through part of an embodiment of a reflective LCD in accordance with the invention.

It will be appreciated that the figures are merely schematic and are not drawn to scale. In particular certain dimensions such as the thickness of layers or regions may have been exaggerated whilst other dimensions may have been reduced. The same reference numerals are used throughout the figures to indicate the same or similar parts.

DETAILED DESCRIPTION OF THE INVENTION

The invention will now be described in greater detail with reference to the figures of the drawing.

Figure 2:
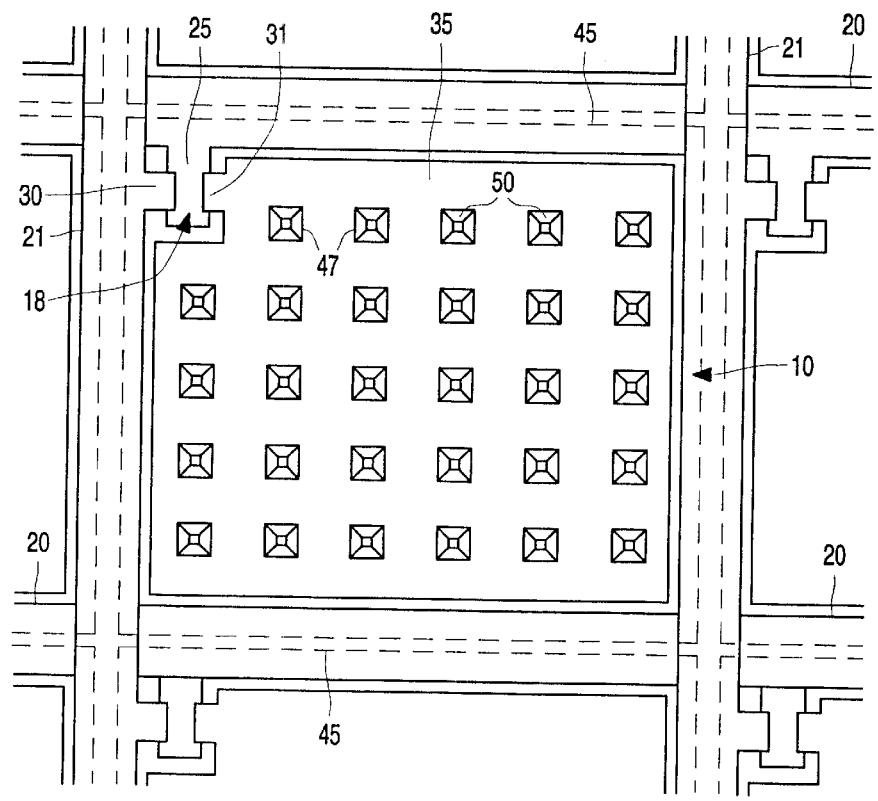
FIG. 2 is a schematic, plan view of the part of the LCD of FIG. 1.

The reflective LCD of FIGS. 1 and 2 comprises a matrix array of display pixels arranged in rows and columns and is of the so-called field shielded pixel type. FIGS. 1 and 2 are, respectively, cross-sectional and plan views through a typical part of the device showing just one display pixel, 10, for simplicity, although it will be appreciated that the device typically may comprise many thousands of display pixels. Referring to these figures, the device comprises a pair of insulating substrates 11 and 12 which are spaced apart and sealed together around their periphery so as to contain a layer of liquid crystal material 15 therebetween. Both substrates are of glass, although only the substrate 11 needs to be optically transparent to transmit light in operation.

The substrate 11 carries on its inner surface adjacent to the liquid crystal layer 15 a transparent electrically conducting layer 16, for example of ITO, which extends continuously over the display area of the device, corresponding to the area of the pixel array, and serves as a common electrode for the display pixels in the array. Over this common electrode an LC orientating film 17 of conventional form is provided.

The other substrate 12 carries on its surface active matrix addressing circuitry and reflective pixel electrodes which define respective individual display pixels. In this embodiment, TFTs 18 are used as the switching devices associated with the display pixels in the active matrix addressing circuitry. The operation of this circuitry and the manner in which the display pixels are driven follows conventional practice, as is described for example in U.S. Pat. No. 5,130,829 to which reference is invited for further information in these respects and whose contents are incorporated herein. The rows of pixels in the array are addressed one at a time in sequence by means of a gating (selection) signal applied to each row in turn which turns on the TFTs associated with the pixels of the row allowing each pixel in the row to be loaded with a respective data signal that determines its display output. Following addressing of all the rows of pixels in this manner in one field period, the rows are addressed again in similar manner in successive fields.

The pixels are connected to sets of row (selection) and column (data) address conductors 20 and 21 carried on the substrate 12 with the gates of all the TFTs 18 in a row of pixels being connected to a respective row conductor 20 and the source electrodes of all the TFTs in a column being connected to a respective column conductor 21. The drain of each TFT is connected to a pixel electrode 45 of its associated display pixel. In this particular embodiment, the TFTs 18 comprise amorphous silicon, bottom gate TFTs. However, top gate amorphous silicon TFTs, or polysilicon TFTs, can be used instead.

The gates and source electrodes of the TFTs comprise integrally formed extensions 25 and 30 of the row and column conductors. The active matrix circuitry comprising the TFTs and the set of rows and column address conductors is formed in conventional manner using standard thin film processing techniques involving the deposition and photolithographic patterning of various layers. The row conductors 20 and gates 25 are provided by depositing and patterning a conductive material such as aluminium or aluminium and chromium. Following this, an insulating layer 26 of silicon nitride or oxide constituting the gate insulator of the TFTs, and serving also to separate the row and column conductors at their cross-over points, is deposited over the entire surface of the substrate 12. Thereafter, a layer 27 of the amorphous silicon is deposited and patterned to leave portions at the locations of the TFTs constituting the channel regions of the TFTs. Doped (n type) amorphous silicon source and drain contact electrodes (not shown) may then be formed over the intrinsic amorphous silicon layer 27 at opposite sides of the gate if desired. The column conductors 21 and TFT source and drain electrodes are then defined by depositing a layer of, for example, a metal, such as Al, a metal alloy, or ITO, and patterning this layer to leave the column conductors with integral extensions 30, for the source electrodes, and the drain electrodes 31. Although a particular structure of TFT of simple form is shown here, it will be appreciated that other kinds of TFT structures which are known in the art can be used instead, with either a top or bottom gate, and that the order in which the layers are provided, the nature of these layers, and the materials employed can be varied accordingly.

The drain electrode 31 of each of the TFTs is provided with an integrally formed extension 35, defined simultaneously with patterning of the drain electrode layer, which extends laterally of the TFT over the substrate surface, and above the insulator layer 26, so as to occupy a substantial proportion of the eventual pixel area. As can be seen particularly from FIG. 2, the electrically conductive extension layer 35 is generally rectangular with its edges extending alongside, and slightly inwards of, adjacent pairs of row and column conductors which border the pixel. This drain extension 35 may be formed separately from a deposited conductive material different to that of the drain electrode 31 and with the extension overlapping, and in electrical contact with, the drain electrode at the region of the TFT, rather than being integrally formed from the same deposited layer.

Over this structure on the substrate 12 a comparatively thick film 40 of insulating material such as silicon nitride or oxide, or an organic insulating material such as a polyimide or a photo-resist, is disposed. The film 40 extends continuously over the entire surface of the substrate and completely covers the TFTs 18, the drain extension layers 35 and the sets of row and column conductors to provide a surface parallel to the substrate surface and spaced from those components upon which the pixel reflective electrodes 45 are formed. Prior to forming these electrodes, however, a series of tapering contact holes, or vias, 47 are provided by a photolithographic process over the area of the extension layer 35 at each pixel which extend through this insulating layer. When using silicon nitride or oxide or a polyimide material, a standard photolithographic process using a resist, exposure through a mask and etching may be employed to form the contact holes. When using a photo-resist polymer, the contact holes can be formed simply by photodeveloping.

The pixel electrodes are then formed by depositing a layer of electrically conductive, light—reflective, material such as aluminium, an aluminium alloy, or silver over the substrate which covers the surface of the layer 40 and the sloping sidewalls of the tapering contact openings 47 to contact electrically with the underlying drain extension layer 35 at each contact opening location. This reflective layer is then photolithographically patterned to leave the array of discrete, mutually-spaced, pixel electrodes 45, each of which is electrically connected with its respective underlying layer 35 via the plurality of contact openings. Each pixel electrode 45 in this embodiment is generally rectangular, for example, approximately 100pm square, and so as to provide a high aperture ratio extends completely over the area between the sections of the two row conductors 20 and the two column conductors 21 bordering the pixel 10 and partly over these conductor sections as well. Each pixel electrode is separated from its adjacent pixel electrodes, which also overlap these conductors, by small gaps so as to maintain electrical isolation between the electrodes. The comparatively thick insulating layer 40 ensures that there are no significant capacitive coupling effects between a pixel electrode 45 and the address conductors at the regions of overlap. The array of pixel electrodes and intervening surface areas of the layer 40 are covered by a continuous LC orientation layer 52 of conventional kind.

The liquid crystal material of the layer 15 comprises a guest-host LC material, for example of the kind described in EP-A-0617310. However, other suitable known types of LC materials could be used. Although desirably the material should be of a type which does not require the provision of a polarising film which would reduce the amount of light utilised for display purposes, a twisted—nematic liquid crystal material could be employed together with a polarising film provided on the outer surface of the substrate 11.

In operation, each row of pixels is addressed in sequence by means of a gating signal applied by a conventional peripheral row driver during a respective row address period which turns on the TFTs associated with the row of pixels so as to transfer image data voltage signals present on the column conductors 21, supplied by a peripheral column driver circuit, to the respective pixels electrodes 45 via the drain extension layers 35 to cause the required display effect from the row of pixels. Light entering the display device through the substrate 11 is modulated by the LC material and reflected by the pixel electrodes back through this substrate, depending on the display state of the individual pixels, to produce a display image.

The plurality of tapering contact openings 47 distributed over the pixel area result in the reflective pixel electrode 45 having reflective depressions 50 at these opening locations which serve to enhance the light scattering characteristics of the pixel electrode, for example, to ensure that light is reflected towards a viewer in a direction generally normal to the plane of the substrate 11 so as to produce a display output of adequately high luminance, bearing in mind that light can be incident on the reflective pixel electrodes from various different angles. The intensity of light reflected perpendicular and near perpendicular to the substrate 11 is thus increased, resulting in a bright display output and improved display quality. The improved scattering characteristics can also be beneficial to increasing the viewing angle.

Figure 3A:
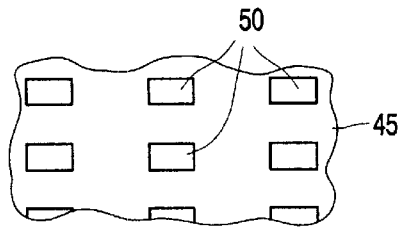
FIGS. 3A to 3G illustrate examples of possible variations in the nature of the pixel electrodes.
Figure 3B:
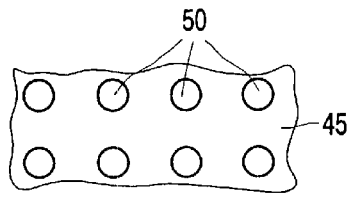
Figure 3C:
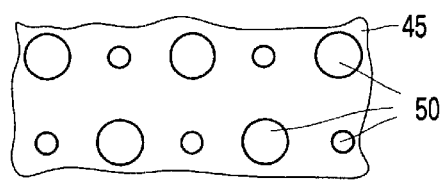
Figure 3D:
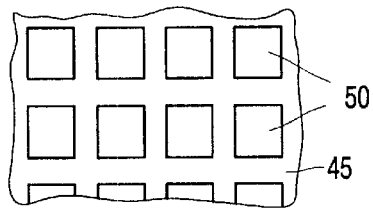
Figure 3E:
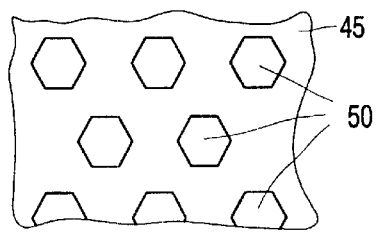
Figure 3F:
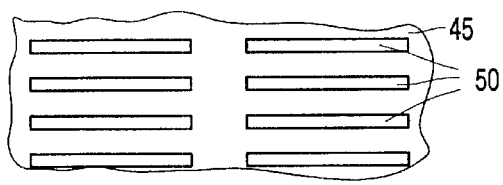
Figure 3G:
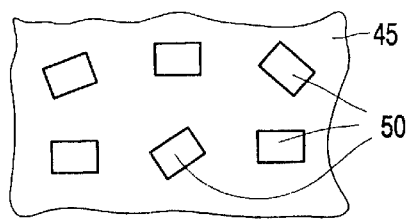

In the example illustrated in FIG. 2, the contact openings 47, and hence the depressions 50, are organised in a regular row and column array, of five rows with each row, apart from the first, having six openings, and with adjacent depressions 50 being separated in both the row and column directions by a similar, predetermined, distance. In this example, the size of the depressions at their opening will typically be around 5 $\mu$m in width or greater. The size, shape and relative dispositions of the openings, and hence depressions, may be varied according to, for example, the overall size of the pixel electrode and the particular reflection characteristics desired. Typically, there will be a few tens of opening per pixel distributed over a substantial proportion, greater than around 50%, of the overall pixel area. The openings may be circular in cross-section or polygonal, for example square, and arranged closer together or further apart, the shape and mutual position being determined by the mask used in the photolithographical patterning of the layer 40. The openings/depressions need not be in a regular, row and column, array but could instead be arranged in a quasi-random fashion. For polygonally-shaped contact openings, the orientation of the individual openings in the array may be varied. A mixture of differently sized and/or differently shaped openings may be provided over the area of the pixel electrode. A smaller number of relatively large openings may be used. Examples of some possible variations are illustrated in FIGS. 3A to 3G which show the shape of the depressions 50 towards their open end in portions of typical pixel electrodes. In FIGS. 3A, 3B, 3D, and 3E the openings are of rectangular, circular, square and hexagonal shape respectively and of substantially similar dimensions. In FIG. 3G, the orientations of the openings, here square shape, are randomly varied.

The depth of the depressions can also be varied to some extent, although this is dependent on the thickness of the layer 40, the degree of tapering of the contact openings 47, and also the thickness of the layer used to form the pixel electrodes. With relatively small openings 47, and/or a relatively thick layer of reflective material for example, the depressions 50 resulting in the pixel electrode may be more generally rounded, and in the form of inverted domes.

These possible variations can be utilised so as to tailor the scattering effects produced and optimise the scattering reflection characteristics of the pixel electrodes.

Preferably, the nature of the depressions 50, i.e. the number, size, shape, positioning, etc is the same for each pixel electrode 45 in the array so that similar, uniform, reflection characteristics are obtained from all the pixels in the array.

In order to enhance still further the scattering effects of the pixel electrodes, the drain extension layer 35 at each pixel is provided with a rough upper surface, as shown at 36 in FIG. 1, which, as a result of the layers 40 and 45 being deposited in sequence thereon, translates through these layers and produces a degree of roughness at the surface of the pixel electrodes 45 in the regions between the depressions. The amount of roughness produced at the surface of the pixel electrodes depends on various parameters, particularly the thickness of the layer 40, but it can be expected that some of the roughness of the layer 35 will be translated to the pixel electrode surface to form a microscopic unevenness at the surface of the pixel electrode which will enhance the light scattering capability of those regions. Such unevenness may be in the form of protrusions, undulations, or other kinds of asperities typically having on average a pitch of around 1 to 3 $\mu$m and a height of around 0.5 to 1 $\mu$m.

Figure 4:
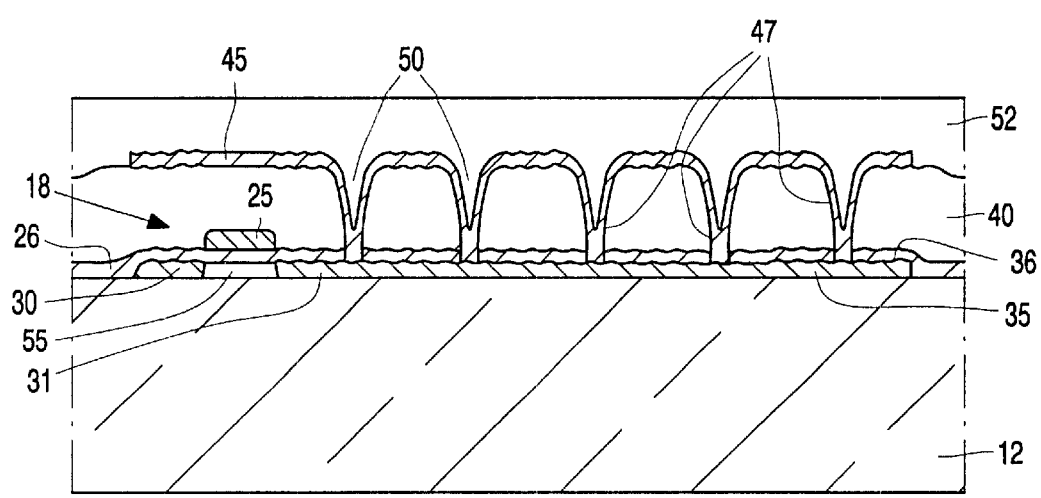
FIG. 4 is a schematic cross-sectional view through part of a second embodiment of a display device according to the invention.

The surface of the layer 35 may be deliberately roughened to this end, for example by etching or other known technique, after it has been deposited or the material of the layer 35 may be deposited in such a manner that the required roughness occurs naturally due to the deposition conditions. A layer of polysilicon material formed by a laser recrystallisation technique and having a rough surface can be created without difficulty. In the case, therefore, of the switching device comprising a polysilicon TFT instead of an a-Si TFT then polysilicon material is conveniently available to be used for this purpose. FIG. 4 is a cross-sectional view through another embodiment of display device using a polysilicon TFT as the switching device. In this device the polysilicon TFT is a top-gate polysilicon TFT of relatively simple structure. The TFT comprises a layer of polysilicon material 55 formed by laser crystallisation on the surface of the substrate 12 over which a gate insulator layer 26, comprising silicon nitride or oxide, is disposed and with the gate 25, for example of an Al alloy, being formed on the insulator layer 26. Regions of the polysilicon layer to either side of the gate are doped to form n+ polysilicon, for example by ion doping using the gate as a mask, to provide source and drain contacts 30 and 31 with the intrinsic polysilicon material extending therebetween constituting the channel. A region of the n+ doped polysilicon layer is left after patterning to provide the drain extension layer 35. Thus, the drain contact 31 and this layer 35 comprise different regions of the same deposited layer. At least this region 35 of the polysilicon layer is formed deliberately in a manner resulting in a rough upper surface 36 having asperities with dimensions in the aforementioned range. The gate insulator layer 26 is also extended to cover the extension layer 35, and in this case extends completely over the substrate surface, but may instead be terminated adjacent the end of the drain contact 31 by appropriate patterning. The layer 40 and the pixel electrodes 45 are then formed over this structure as before with contact openings 47 being provided through the layer 40, and the extension of the gate insulator layer 26 if present, before deposition of the reflective layer constituting the electrodes 45 so that the electrode material penetrates the openings and contacts the underlying n+ polysilicon layer 35, and with the roughness of the surface of the layer being translated to the surface of the pixel electrodes to cause microscopic surface irregularities and unevenness. Depending on the particular kind of TFT structure used, a further insulating layer may be deposited after forming the gates 25 and prior to depositing the layer 40.

While the roughness of the layer 35 here is conveniently obtained as a direct consequence of the manner of the layer formation, other techniques may be used deliberately to introduce such roughness, for example by an etching process. These techniques are applicable also in the case where the layer 35 is formed separately from, but in contact with, the drain electrode, for example from a deposited metal layer.

The switching devices of the active matrix circuitry need not comprise TFTs but may instead comprise two-terminal non-linear switching devices such as MIMs or TFDs (thin film diodes). In a display device using such switching devices, it is usual to provide just the set of row, selection, address conductors on one substrate and the set of column, data signal, address conductors on the other substrate. The switching devices and the pixel electrodes can be provided on either substrate but normally on the substrate carrying the row conductors. The switching devices typically comprise a pair of conductive contact layers between which a layer of insulating, or semi-insulating, material is sandwiched. One contact is connected to the row conductor, and may be an integrally formed extension, and the other, output, contact is connected to the associated pixel electrode. This output contact may be formed with an integral extension to provide the contact layer 35 underlying the pixel electrode 45 or the layer 35 may be formed from a separately deposited conductive layer contacting the output contact of the switching device.

For reflective mode operation, the substrate 12, unlike the substrate 11, need not be transparent and may be of a semiconductor material, such as a single crystal silicon wafer, rather than an insulating material such as glass.

It will be appreciated that the display devices can be full colour display devices as well as monochrome display devices. To this end, an array of colour filter elements associated with the pixel array may be carried in the substrate 11, for example, as described in EP-A-0617310.

In summary, therefore, a reflective LCD has been disclosed of the kind comprising on a substrate an array of reflective pixel electrodes which are each connected to the output of a respective switching device, e.g. a TFT, carried on the substrate and which are provided on an insulating layer that extends over the switching device, and in which each pixel electrode is connected to the output of its associated switching device through a plurality of tapered contact openings in the insulating layer which form depressions in the pixel electrode surface for enhancing the pixel's light reflection characteristics. The number, shape, size and relative disposition of such openings can be varied to tailor these characteristics. Preferably, a conductive layer extends from the switching device output beneath the area of the pixel electrode for contacting the electrode at each opening and may have a rough surface resulting in asperities at the pixel electrode surface which further enhance its reflection properties.

From reading the present disclosure, other modifications will be apparent to persons skilled in the art. Such modifications may involve other features which are already known in the field of LCDs and component parts thereof and which may be used instead of or in addition to features already described herein.

What is claimed is:

1. A reflective liquid crystal display device comprising first and second substrates between which liquid crystal material is disposed and electrodes provided on the substrates defining an array of display pixels, the first substrate having an array of optically reflective pixel electrodes each of which is connected to an output of a respective switching device carried on the first substrate and is provided on a single surface of an insulating layer extending over the first substrate and covering the switching devices, characterized in that the respective pixel electrode is connected to the output of the switching device via a plurality of mutually separate contact openings in the insulating layer at spaced locations over an area of the respective pixel electrode and the contact openings having sloping sidewalls over which the respective pixel electrode extends and all portions of the respective pixel electrode extending over the sidewalls separated from each other only by portions of the insulating layer.

2. A reflective liquid crystal display device according to claim 1, characterised in that the contact openings are arranged regularly over a substantial part of the pixel electrode area.

3. A reflective liquid crystal display device according to claim 2, characterised in that the contact openings of each pixel are of substantially identical size and shape.

4. A reflective liquid crystal display device according to claim 2, characterized in that the respective pixel electrode contacts, via the plurality of contact openings, an electrically conductive layer which electrically conductive layer extends beneath the insulating layer over the area occupied by the plurality of contact openings and is connected to the switching device output.

5. A reflective liquid crystal display device according to claim 2, characterised in that the contact openings are arranged in rows and columns.

6. A reflective liquid crystal display device according to claim 5, characterised in that the contact openings of each pixel are of substantially identical size and shape.

7. A reflective liquid crystal display device according to claim 1, characterized in that the respective pixel electrode contacts, via the plurality of contact openings, an electrically conductive layer which electrically conductive layer extends beneath the insulating layer over the area occupied by the plurality of contact openings and is connected to the switching device output.

8. A reflective liquid crystal display device according to claim 7, characterised in that the electrically conductive layer has a rough surface so as to form surface asperities in the pixel electrodes via the insulating layer extending thereover.

9. A reflective liquid crystal display device according to claim 8, characterised in that the switching device comprises a thin film transistor and in that the electrically conductive layer comprises an integrally formed extension of a drain electrode of the thin film transistor.

10. A reflective liquid crystal display device according to claim 7, characterised in that the switching device comprises a thin film transistor and in that the electrically conductive layer comprises an integrally formed extension of a drain electrode of the thin film transistor.

* * * * *